US006503989B1

(12) United States Patent
Hruska

(10) Patent No.: US 6,503,989 B1
(45) Date of Patent: Jan. 7, 2003

(54) POLYOLEFIN-BASED PRINTABLE ARTICLES

(75) Inventor: Zdenek Hruska, Munich (DE)

(73) Assignee: Solvay (Societe Anonyme), Brussels (BE)

( * ) Notice: Subject to any disclaimer, the term of this patent is extended or adjusted under 35 U.S.C. 154(b) by 0 days.

(21) Appl. No.: 09/624,163

(22) Filed: Jul. 24, 2000

(30) Foreign Application Priority Data

Jul. 26, 1999 (BE) ............................................ 09900505

(51) Int. Cl.[7] ........................ C08L 23/30; C08L 23/26; B41M 1/30; C08J 5/18; C08J 7/12; C08F 8/06; C08F 6/00

(52) U.S. Cl. ................ 525/333.7; 525/186; 525/326.7; 525/333.8; 525/379; 525/374; 525/381; 427/224; 427/457; 427/532; 427/533; 427/534; 427/536; 427/539; 427/569; 427/553; 427/558; 427/331; 427/372.2; 427/393.5; 428/500; 428/523; 522/126; 522/157; 522/161; 528/492; 101/483; 347/1

(58) Field of Search .............................. 101/483; 347/1; 427/224, 457, 532, 533, 534, 536, 539, 569, 553, 558, 331, 372.2, 393.5; 428/500, 523; 522/126, 157, 161; 528/492; 525/186, 326.7, 333.7, 333.8, 379, 381, 374

(56) References Cited

U.S. PATENT DOCUMENTS 4,144,363 A * 3/1979 Balloni et al. ............... 427/322
5,654,378 A    8/1997 Dehennau et al. ......... 525/333.7
5,776,604 A * 7/1998 Lu et al. ...................... 428/343
5,891,552 A * 4/1999 Lu et al. ...................... 428/195
5,910,359 A * 6/1999 Kobayashi et al. .......... 428/327
5,922,161 A * 7/1999 Wu et al. .................. 156/272.6
6,217,687 B1 * 4/2001 Shibata et al. ................ 156/82
6,238,785 B1 * 5/2001 Kitamura et al. ............ 428/323

FOREIGN PATENT DOCUMENTS

DE     196 02 545    8/1997
EP      0 678 398     4/1995
WO    WO 97/27245   7/1997

OTHER PUBLICATIONS

Derwent Abstract AN 1980–85421c of JP 55 133959, Oct. 18, 1980.

\* cited by examiner

*Primary Examiner*—Rabon Sergent
(74) *Attorney, Agent, or Firm*—Larson & Taylor PLC

(57) ABSTRACT

A monolayer polyolefin-based printable article includes 0.1 to 5% by weight of at least one polyaminoalkylene, and is characterized in that it has been treated by means of an oxidative surface treatment, such as a corona treatment. A process for the manufacture of a polyolefin-based printable article, according to which at least one surface region of the article, including at least one polyolefin and from 0.1 to 5% by weight of at least one polyaminoalkylene, involves subjecting the region to an oxidative surface treatment. A printing process, according to which a polyolefin-based article, including from 0.1 to 5% by weight of at least one polyaminoalkylene and treated by means of an oxidative surface treatment, utilizes an electrophotography technique to print on the article.

8 Claims, No Drawings

POLYOLEFIN-BASED PRINTABLE ARTICLES

FIELD OF THE INVENTION

The present invention relates to a polyolefin-based article which is capable of being printed, in particular by digital printing techniques, such as electrophotography.

BACKGROUND OF THE INVENTION

In numerous applications, articles composed of plastic, in particular films, sheets and hollow bodies, are printed by means of conventional printing techniques, by means of inks based on colorants dissolved in solvents. Techniques for the surface treatment of the substrates have been developed for the purpose of improving the adhesion of these conventional inks to various substrates. Thus, in European Patent Application EP 678,398 (Solvay), it is indicated that the oxyfluorination of polyolefin-based articles under specific conditions makes it possible to print them using inks for PVC, which is impossible in the absence of this surface treatment.

Recent years have, however, seen the development of printing techniques referred to as "contactless" printing techniques, for example the electrophotography technique. This technique, which is widely used in computer-controlled digital printers, makes use of inks which are completely different from those used in conventional printing techniques and which are generally described as "toners". Thus, in dry ink electrophotography, the toner is a fine powder which is deposited on the substrate to be printed in a first stage and melted in a second stage, so as to bring about its adhesion to the substrate (example: Xeikon® process). In liquid ink electrophotography, the toner is a powder dispersed in a non-solvent diluent (example: Indigo® process). Whether liquid or dry, these toners have characteristics which are completely different from those of conventional inks and are generally unsuitable for the same substrates. Thus, if an attempt is made to print a polyolefin film by electrophotography, whether using dry or liquid inks and even after corona treatment, very poor results are obtained in the sense that there is virtually no adhesion of the toner to the film. As a consequence, manufacturers of polymer substrates intended for this technique generally have to coat their substrates with a surface layer of a coating suitable for printing, for example based on polyethylene terephthalate (PET) or on polyamide. The production of such a coating naturally results in a significant increase in the cost of the substrate and can, in some cases, be harmful to some of its mechanical, visual or other properties.

SUMMARY OF THE INVENTION

The present invention is targeted at overcoming these disadvantages by providing a polyolefin-based article which can be used in particular in processes for printing by electrophotography by means of dry or liquid toners and which is simple to manufacture and inexpensive.

The present invention is consequently targeted at providing a polyolefin-based printable article comprising from 0.1 to 5% by weight of at least one polyaminoalkylene, characterized in that it has been treated by means of an oxidative surface treatment.

DETAILED DESCRIPTION OF THE PREFERRED EMBODIMENTS

The term "polyolefin-based article" is understood to denote articles, at least a portion of the surface of which (generally a portion intended to be printed) comprises at least 60% (and preferably at least 80%) by weight of at least one polyolefin, that is to say of a polymer comprising at least 80% by weight of one or more olefins, such as ethylene, propylene, butene, styrene, a diene, and the like. These olefins can be aliphatic, aromatic, cyclic or other olefins. In addition to one or more olefins, the polyolefin can optionally comprise one or more other monomers, such as carbon monoxide, acrylic groups, and the like. However, it is preferable for the polyolefin not to comprise any non-olefinic monomer. According to an advantageous alternative form, the polyolefin comprises at least 94% by weight of the same olefin and optionally up to 6% of one or more other olefins. In addition to at least one such polyolefin, the article can comprise one or more conventional additives, such as stabilizers, lubricants, antioxidants, pigments, fillers, and the like. Furthermore, the article can optionally comprise one or more other polymers (preferably thermoplastic polymers). With the exception of one or more polyaminoalkylenes as described below, it is preferable, however, for the article not to comprise any polymer which is not a polyolefin. The polyolefin advantageously comprises at least 80% by weight of propylene. The polyolefin is preferably a propylene homopolymer or, better still, a random copolymer of ethylene and of propylene comprising at least 2% of ethylene. This is because such a polymer promotes the migration into the surface of the polyaminoalkylene.

The article can be of any type, for example a sheet, a film, a plate, a hollow body or a solid body. It is advantageously a film or a plate. This article may have been manufactured by any appropriate technique, for example by pressing, injection moulding, extrusion moulding, extrusion blow-moulding, calendering, and the like. The invention applies very particularly to the manufacture of flexible films with a thickness of less than 0.5 mm.

The article can be monolayer or multilayer. In the case of multilayer articles, the abovementioned content of polyaminoalkylene(s) relates specifically to the polyolefin-based surface layer (indeed even to one or more regions of the latter). For example, the article can be composed of a plate made of any material (for example of polymer or of metal), which plate is coated on one of its faces (or on a portion of one of its faces) with a film of polyolefin(s) comprising from 0.1 to 5% of at least one polyaminoalkylene, this amount being expressed with respect to the weight of the polyolefin or polyolefins.

A considerable advantage of the invention is that this combination of a polyolefin, of a polyaminoalkylene and of an oxidative surface treatment makes it possible to manufacture articles which do not have an expensive surface coating but which nevertheless exhibit excellent printability with respect in particular to techniques such as electrophotography. The invention consequently also relates to an article as defined above, characterized in that it is a monolayer article. Very good results are obtained when the article is provided in the form of a monolayer film. Alternatively, good results have also been obtained when the article is a multilayer film comprising a first layer of plastic with a high filler content and a second (surface) filler-free layer comprising a polyolefin and a polyaminoalkylene, which has been subjected to an oxidative surface treatment as described above.

The polyaminoalkylene (hereinafter described as "PAA") is a polymer composed essentially of aminoalkylene groups, that is to say comprising an amine group and a $C_2$ to $C_5$ alkylene radical which is preferably an ethylene radical. The amine group is optionally protonated, that is to say existing in the form of its conjugate acid. Mention may be made, as aminoalkylene groups, of, for example, —CH$_2$—CH$_2$—NH$_2^+$—, —CH$_2$—CH$_2$—NH$^{+<}$, $^{>N-CH}_2$—CH$_2$—CH$_2$—N< or —CH$_2$—CH$_2$—N<. Polymers of this type are commercially available, for example polyalkyleneimines or poly(iminopropane-1,3-diyl) dendrimers comprising NH$_2$ end groups. Among polyalkyleneimines, it is preferable to use polyethyleneimines. Among dendrimers, it is preferable to use those which comprise at least 8 -NH$_2$ end groups per molecule.

The PAA can optionally be modified with alkyl, aryl or alkoxy groups. For example, the PAA may have been grafted with stearic acid. The molecular mass of the PAA is preferably between 2000 and 25,000 g/mol. Several PAAs can optionally be used as a mixture.

The amount of PAA is expressed with respect to the weight of the polymer or polymers present (other than the PAA). Its amount is preferably less than or equal to 1% and, in a particularly preferred way, less than or equal to 0.6%. It has been found, surprisingly, that extremely low proportions of PAA make it possible to obtain a significant improvement in the printability, while avoiding having a significant effect on the properties of the article.

The term "oxidative surface treatment" is understood to denote a surface treatment, such as, for example, a corona treatment carried out in the presence of oxygen, an oxyfluorination treatment by means of a gas mixture comprising oxygen and fluorine, a treatment by means of an oxidative plasma, a treatment with ozone in the presence of ultraviolet radiation, or a flame-brushing treatment. Several such treatments can optionally be combined. Although the entire surface of the article (or all of one of its faces, in the case of an article with 2 faces, such as a film or a hollow body) is generally treated, it is naturally possible to treat only a portion of the surface of the article, for example solely the surface region or regions which will subsequently be printed.

The oxyfluorination treatment is preferably carried out under conditions such that, in the surface region treated, the oxygen/carbon (O/C) atomic ratio, measured by ESCA (Electron Spectroscopy for Chemical Analysis) spectroscopy at a depth of 1.5 nm, is at least 0.08 and that the fluorine/carbon (F/C) atomic ratio, measured in the same way, has a value of at least 90% of that of the O/C ratio and of at most 290% of this ratio. It preferably takes place under conditions such that the O/C atomic ratio is greater than 0.1. Furthermore, the O/C ratio is generally less, than 0.4 and preferably less than 0.3. The F/C ratio is preferably greater than 95% of the O/C ratio. It is advantageously less than 200% of this ratio.

For the printing by electrophotography by means of liquid toners, it is preferable for the oxyfluorination treatment to be moderated, that is to say carried out at the surface at an F/C atomic ratio (measured as indicated above) of less than 0.1.

The corona treatment is preferably carried out at a temperature of less than 100° C. and with a specific corona energy of 50 to 500 W.min/m$^2$. The corona treatment leads to excellent results, both for printing with dry toners and with liquid toners. It is consequently preferable for the oxidative surface treatment to comprise a corona treatment.

Consequently, another subject-matter of the present invention is a process for the manufacture of a polyolefin-based printable article, according to which at least one surface region of the article, comprising at least one polyolefin and from 0.1 to 5% by weight of at least one polyaminoalkylene, is subjected to an oxidative surface treatment. The oxidative surface treatment preferably comprises a corona treatment.

The invention additionally relates to a printing process, according to which a polyolefin-based article, comprising from 0.1 to 5% by weight of at least one polyaminoalkylene and treated by means of an oxidative surface treatment, is printed by using an electrophotography technique.

As regards these processes, the abovementioned preferences remain in force.

EXAMPLES

The following examples illustrate the invention in a non-limiting way. Examples 3 and 4 are in accordance with the invention and Examples 1 R, 2R and 5R to 7R are given by way of comparison.

Several tests carried out by printing various films with a thickness of 100 µm, which films are obtained by extruding a propylene copolymer comprising 3% of ethylene (Solvay Eltex® P KS001F) with which a PAA (the product Lupasol® WF is a polyethyleneimine with a molecular mass of 20,000 to 25,000 g/mol) was optionally mixed, by the Indigo® technique (electrophotography by means of a liquid toner) are summarized in the following table.

The printability of these films was evaluated according to ASTM Standard D3359-93 (method A) and is indicated in the table below according to a scale from 0A (very poor printability) to 5A (very good printability).

When a corona treatment is mentioned, it was carried out at room temperature with a specific corona energy (SCE) of approximately 190 W.min/m$^2$.

| Example | Article | PAA (% by weight) | Printability |
|---|---|---|---|
| 1R | Untreated PP film | Lupasol WF (0.5%) | 2A |
| 2R | Fluorinated PP film (F/C = 0.25) | Lupasol WF (0.5%) | 3A |
| 3 | Oxyfluorinated PP film (F/C = 0.096) | Lupasol WF (0.5%) | 4A/5A |
| 4 | Corona-treated PP film | Lupasol WF (0.5%) | 5A |
| 5R | Untreated PP film | 0% | 0A |
| 6R | Corona-treated PP film | 0% | 0A |
| 7R | Oxyfluorinated PP film | 0% | 0A |

It is clearly observed that an oxidative surface treatment is essential and that it is the corona treatment which gives the best results.

What is claimed is:

1. A monolayer printable article having a polymer composition in at least that portion of the article intended to be printed upon comprising at least 60% by weight of at least one polyolefin and from 0.1 to 5% by weight of at least one polyaminoalkylene based on the weight of the at least one polyolefin, the polymer composition having been treated by means of an oxidative surface treatment.

2. The article according to claim 1, wherein the polyolefin comprises at least 80% by weight of propylene.

3. The article according to claim 1 is a film.

4. The article according to claim 1, wherein the polyaminoalkylene is a polyethyleneimine.

5. The article according to claim 1, wherein the oxidative surface treatment comprises a corona treatment.

6. A process for the manufacture of a monolayer printable article having a polymer composition in at least that portion of the article intended to be printed upon comprising at least 60% by weight of at least one polyolefin and from 0.1 to 5% by weight of at least one polyaminoalkylene based on the weight of the at least one polyolefin, the process comprising subjecting the polymer composition to an oxidative surface treatment.

7. The process according to claim 6 wherein the oxidative surface treatment comprises a corona treatment.

8. A printing process comprising printing by an electrophotography technique on a monolayer printable article having a polymer composition in at least that portion of the article intended to be printed upon comprising at least 60% by weight of at least one polyolefin and from 0.1 to 5% by weight of at least one polyaminoalkylene based on the weight of the at least one polyolefin, the polymer composition having been treated by means of an oxidative surface treatment.

\* \* \* \* \*